United States Patent Office 3,424,529
Patented Jan. 28, 1969

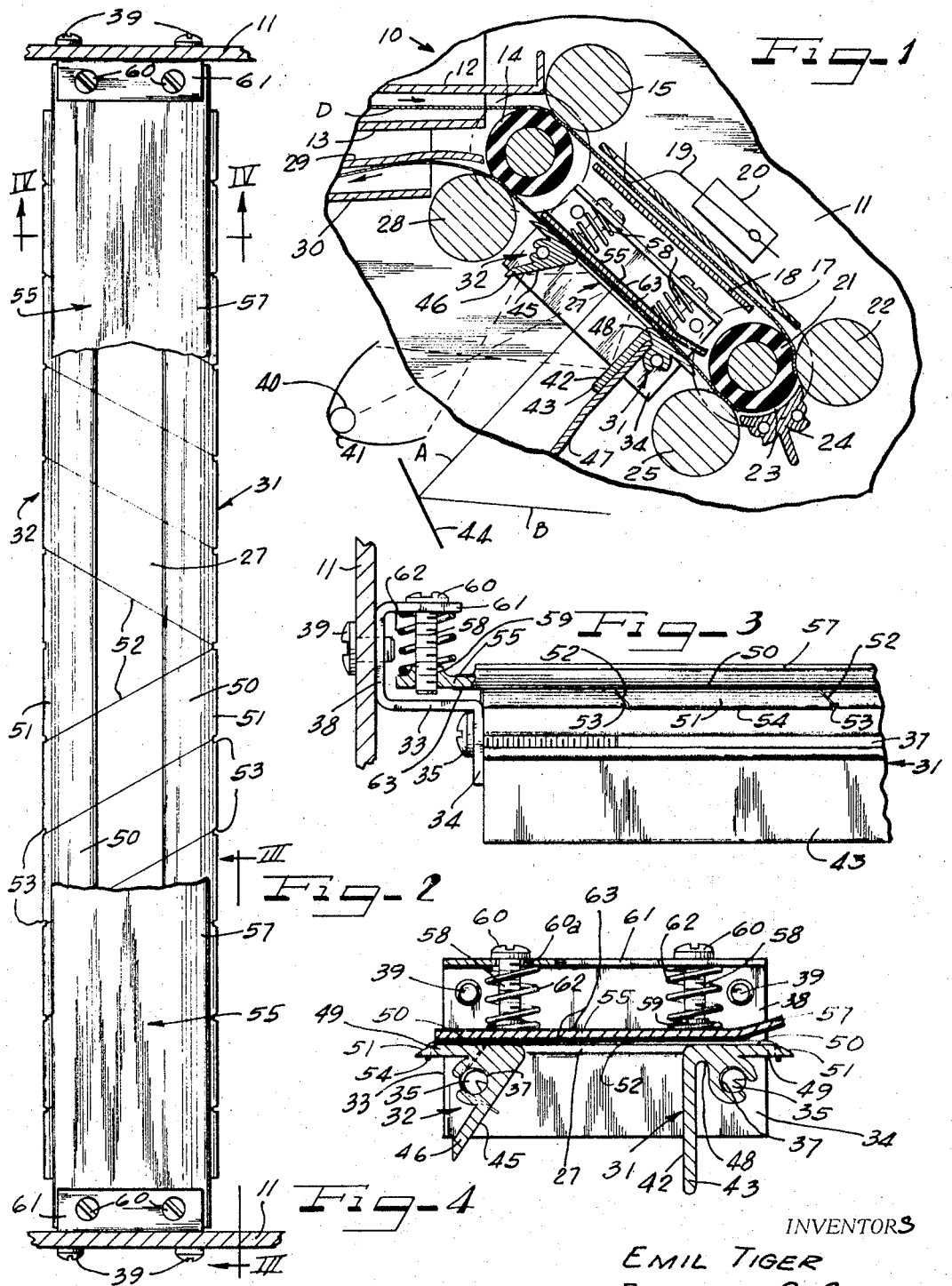

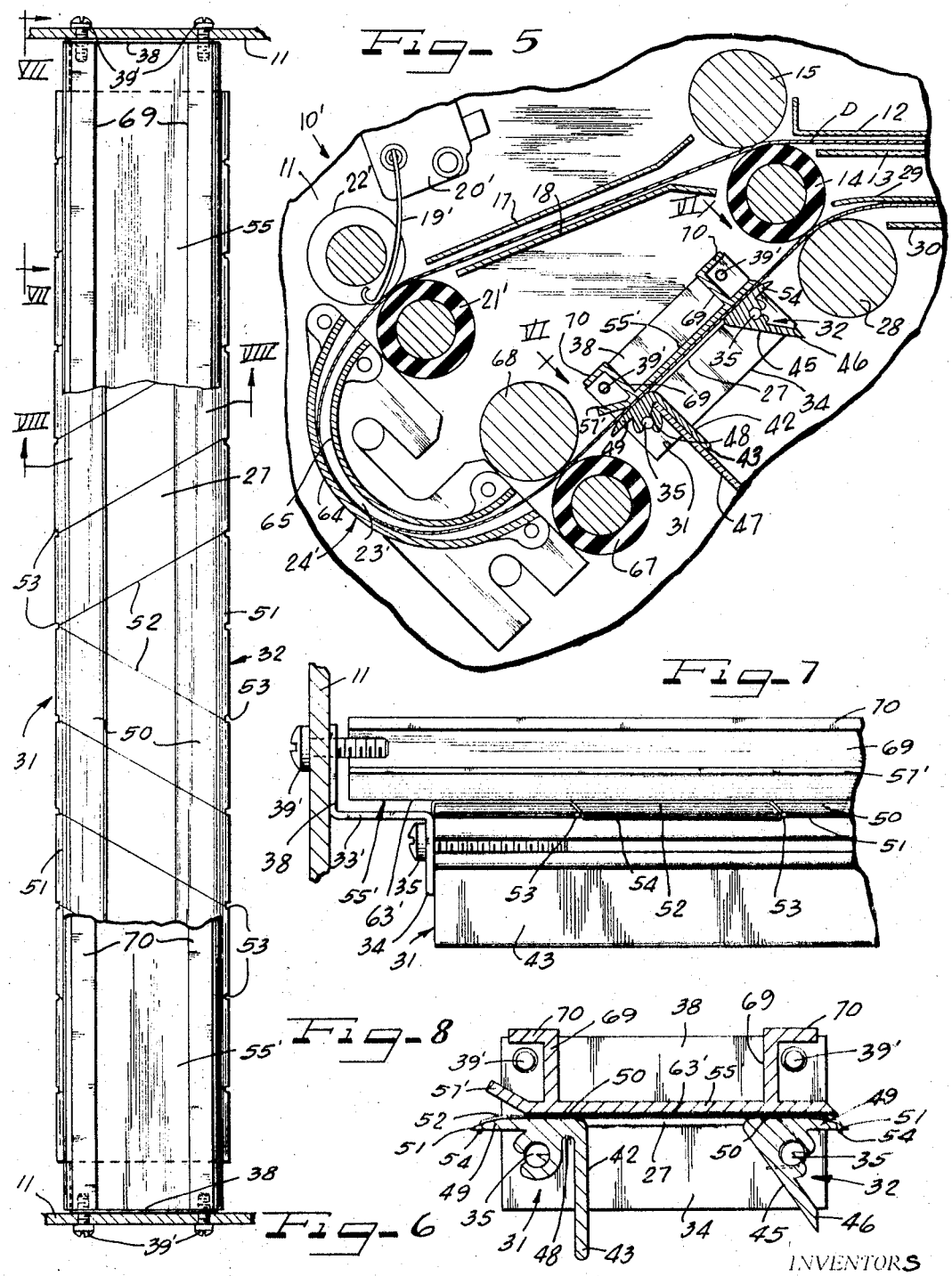

3,424,529
PAPER GUIDE FOR ELECTROPHOTOGRAPHIC
COPYING MACHINES AND THE LIKE
Emil Tiger, Highland Park, Erskine G. Corman, Forest Park, and Kenneth R. Reick, Downers Grove, Ill., assignors to Formfoto Manufacturing Company, Villa Park, Ill., a corporation of Illinois
Continuation-in-part of application Ser. No. 410,549, Nov. 12, 1964. This application Oct. 23, 1965, Ser. No. 503,748
U.S. Cl. 355—51  20 Claims
Int. Cl. G03b 27/50, 27/70

ABSTRACT OF THE DISCLOSURE

A paper guide for electrophotographic copying machines and the like has rollers arranged to feed in document sheets from an entrance and to feed out the document sheets to an exit after the sheets have moved through a turn-around guide and across a scanning aperture after leaving the guide. The scanning aperture comprises spaced bars attached at their ends to brackets which are secured to supports in the machine. A floatingly supported hold-down plate confronts the aperture bars. In one form the plate is guided by pins attached thereto and engaging the brackets and biasing springs about the pins thrust the plate toward the aperture. In another form the plate is gravitationally biased and has flanges thereon which co-operate with guide pins serving also as bracket-securing screws. The aperture-opposing face of the hold-down plate has a light color to enhance delineation of scanned markings on the document paper, and to eliminate edge drop-off or darkness on the copies made from the document where the document is narrower than the copy sheet.

---

The present application is a continuation-in-part of our pending application Ser. No. 410,549, filed Nov. 12, 1964, now Patent No. 3,345,926 issued Oct. 10, 1967.

This invention relates to improvements in paper guide structures such as are especially adapted for use in electrophotographic copying machines and the like, and more particularly concerns a new and improved paper guide structure associated with the exposure aperture in apparatus of the indicated type.

In producing electrophotographic copies, for example, the master or original paper document to be copied is transported across a scanning aperture where the face of the document to be reproduced is intensely illuminated as it progressively passes the aperture and is thereby progressively scanned by an optical system and the image then projected onto an electrostatically charged copying member such as a paper sheet. As the document to be copied passes the aperture, it must be maintained in a predetermined scanning plane in order to maintain sharp focus and thus sharp image reproduction. This means that the document sheet must be carefully guided in a preferably flat condition as it moves in the scanning plane. Document sheets of various thicknesses must be accommodated automatically, as must also multiple thicknesses, paper clips, and the like, without jamming. Further, the background provided by the paper guide structure should avoid side shadows on the image transposed to the copy paper, where the document is narrower than the copy paper.

An important object of the present invention is to provide new and improved scanning aperture means for electrophotographic copying machines and the like.

Another object of the invention is to provide new and improved paper guide means for the scanning apertures of copymaking machines.

A further object of the invention is to provide new and improved paper guide structure for scanning apertures especially suitable for high speed travel of paper sheets therethrough.

Still another object of the invention is to provide a new and improved paper guide structure of the character described which has a novel floatingly adjustable hold-down or pressure plate.

A yet further object of the invention is to provide a new and improved simplified scanning aperture and paper guide means and mounting structure therefor.

Yet another object of the invention is to provide improved paper hold-down plate means for scanning apertures for electrophotographic and like copymaking machines providing advantageous elimination of side shadows and improvements in the definition of the documentary material scanned.

Other objects, features and advantages of the present invention will be readily apparent from the following detailed description of certain preferred embodiments thereof taken in conjunction with the accompanying drawings, in which:

FIGURE 1 is a fragmentary sectional detail view through a scanning aperture of a copymaking machine and document transport means associated therewith and disclosing an embodiment of the invention;

FIGURE 2 is a sectional plan view, partially broken away for illustrative purposes, taken substantially on the line II—II of FIGURE 1;

FIGURE 3 is a fragmentary sectional elevational detail view taken substantially along the line III—III of FIGURE 2 and on an enlarged scale;

FIGURE 4 is an enlarged fragmentary sectional view taken substantially on the line IV—IV of FIGURE 2;

FIGURE 5 is a fragmentary sectional view similar to FIGURE 1 but showing a modification;

FIGURE 6 is a sectional plan view taken substantially on the line VI—VI of FIGURE 5, with the hold-down plate partially broken away for illustrative purposes;

FIGURE 7 is an enlarged fragmentary sectional elevational view taken substantially along the line VII—VII of FIGURE 6; and FIGURE 8 is a cross sectional detail view taken substantially on the line VIII—VIII of FIGURE 6.

In FIGURES 1–4, the invention is embodied in a copymaking machine assembly 10 which may be substantially according to the disclosure in our application Ser. No. 410,549, which to the extent that details of structure are omitted herein is incorporated by reference. An enclosing housing includes opposed spaced vertical wall panels 11 between and on which are mounted document feeding means including document feed-in guide means comprising a pair of substantially horizontal upper and lower narrowly spaced guide passage-defining plates 12 and 13 which guide a document D to be copied to the nips of a driven rubber-covered feed roller 14 and a coacting idler roller 15 set to divert the document diagonally downwardly within the cabinet through a guide passage defined by an upper guide plate 17 and a closely adjacently spaced substantially parallel lower guide plate 18, a trip arm 19 on a control switch 20 for the machine being located to be actuated by the document. Thence, the document D is guided into the nips of a driven rubber-covered friction feed roller 21 and an idler roller 22 set to bend the leading edge of the document into the entry end of a turn-around guide passage 23 defined, in this instance, by and between the cylindrically curved surface of the roller 21 and a complementary semi-cylindrically concave opposing closely spaced guide surface of a guide bracket 24 which may be in the form of an extruded aluminum bar secured at its opposite ends to the respective wall panels 11. From the exit end of the passage 23 the document passes into the nips of the driven roller 21 and an idler roller 25 by which the document is fed forwardly and generally upwardly in reverse direction to its direction of travel to the turn-around roll and guide passage means.

From the rollers 21 and 25 the document is directed to travel with its information-carrying face across and past a scanning aperture 27 which is of suitable narrow width and elongated to extend transversely across and, in this instance, under the path of travel of the document as advanced at a predetermined high speed in continuous flow by the roller and guide transport system. Beyond the scanning aperture 27, the scanned document D enters between the nips of the roller 14 and a return idler roller 28 from which it is guided into a substantially horizontal plane forwardly into a return passage defined between an upper guide plate 29 and a lower spaced guide plate 30 and located adjacently below the lower plate 13 defining the upper in-feed passage. Thus, the document D is transported in a fairly short high speed scanning circuit occupying a minimum space in the housing of the machine and comprising only the two sets of rollers and associated guiding structure adjacent to the scanning aperture.

Means defining the scanning aperture 27 comprise an approach edge bracket bar 31 and a recession edge bracket bar 32 which are suitably spaced apart in parallel relation and are mounted at their opposite ends on the respective sidewall panels 11 in suitable manner, desirably as a unitary frame through the medium of respective identical brackets 33. For this purpose, each of the brackets has a bar-mounting flange 34 through which extend self-threading drive screws 35 engaging in respective longitudinally extending preformed drive screw socket bores 37 extending longitudinally in the respective bars 31 and 32 which are desirably formed as aluminum or similar lightweight metal extrusions. Each of the brackets 33 has an attachment flange 38 offset relative to the flange 34 and by which the bracket is attached as by means of a pair of horizontally spaced screws 39 to the respective sidewall panels 11.

Illumination of the document D as it passes the scanning aperture 27 is effected by means comprising a light source such as a lamp 40 mounted within the trough of a channel-shaped parabolic reflector 41 located below the horizontal portions of the document transport system and condensing and intensifying the light from the lamp 40 and projecting such light into the scanning aperture above an image reflection path A from the aperture to a scanning mirror 44 mounted below the reflector 41 and beaming the image in a path B in an optical system which ultimately projects the beam into an exposure aperture past which a copy sheet is transported in synchronism with transportation of the document D through the aperture 27.

In order to enhance and intensify the illumination received in the aperture 27, reflecting surfaces are provided at least along each longitudinal edge defining the aperture to reflect into the aperture light rays which would otherwise be lost by spreading beyond the effective area of the aperture. For this purpose, such reflecting surfaces are conveniently and efficiently provided by a reflecting surface 42 on a flange 43 of substantial width extending inwardly on the bar 31 and along the length of the approach edge of the aperture. For the same purpose, a reflecting surface 45 is provided on an inwardly extending flange 46 on the bar 32 along the recession edge of the aperture. For maximum light-gathering and concentrating effect, the reflecting surfaces 42 and 45 are divergently related to one another and to the axis of the center of the lamp 40 and the center of the scanning aperture 27. Further, the planes of the respective reflecting faces or surfaces 42 and 45 if projected pass outside of the longitudinal edges of the reflecting surface of the reflector 41. Additionally, of course, the planes of the reflecting surfaces 42 and 45 are at proper angles relative to the aperture 27 to reflect light rays efficiently into the aperture, while avoiding any interference with image reflection to the mirror 44.

Light shielding of the scanning area is afforded by, in addition to the sidewalls 11, and other closure and panel structure not shown, the guide plate 30 at the top, and a rear shielding panel 47 which has its upper edge attached to the aperture bracket bar 31, which, for this purpose, is provided with a longitudinal downwardly and forwardly opening groove 48 at the root of the flange 43 on the opposite side from the reflecting face 42.

Each of the aperture bars 31 and 32 has document guiding means along the longitudinal edges of the aperture and comprising on each of the bars a similar guide flange 49 provided with an upper guide surface 50 of substantial width having a turned down or chamfered portion 51 along the outer edge of the flange. Disposition of the surfaces 50 is in a common plane aligned with the nips of the paper transport rollers 21 and 25 at the approaching side of the assembly and the nips of the rollers 14 and 28 at the recession side of the assembly. Further, the plane in which the guide surface 50 is disposed is in an upward and forward oblique direction within the machine cabinet to accommodate the preferred relationship of the aperture 27 between the opposed edges of the surfaces 50 to the reflector 41 and the scanning mirror 42, whereby the bar 31 may be referred to as the lower bracket bar and the bar 32 as the upper bracket bar.

In order to prevent possible turning of the lead-in edges of documents into the aperture 27, fine guide wire strands 52 are stretched across the aperture 27 in diagonal relation to avoid obscuring the scanned image as the document flows across the aperture. Desirably the strands 52 comprise a single wire which is strung over the surfaces 50 of the flange 49 between suitable shallow notches 53 in the respective oppositely directed edges of the flanges and between which notches respective spacer loops 54 of the wire are engaged as best seen in FIG. 3. At its opposite ends the wire is held taut by clamping the respective end portions between the respective bracket flanges 34 and the opposite end portions of the bracket bar 32 (FIG. 4). As best seen in FIG. 2, the guide strands 52 are directed diagonally in opposite divergent directions from the longitudinal center of the aperture 27 in each direction. This tends to maintain the paper straight in its path of movement over the aperture and even tends to spread out any wrinkling tendency that may be present in the paper as it passes thereover.

Cooperative in document-guiding relation with the bracket bars 31 and 32 is an elongated complementary holdown and guiding plate 55 which extends across the scanning aperture 27 throughout its length and affords an opaque backing for the document holding the document flat and in proper focusing plane in respect to the scanning optical system. At the approach side of the aperture assembly, the plate 55 has a turned up lead-in longitudinal marginal flange 57 affording with the adjacent tapered edge 51 a lead-in mouth for the leading edges of successive documents. On its inner face, at least, the plate 55 is in complementary plane relation to the guide faces 50 and opposes the strands 52 in paper guiding relation.

In order to accommodate various thicknesses of documents, double sheets, documentary fasteners such as staples, and the like, the plate 55 is mounted for a substantial range of floating movement into spaced relation with the guide surface provided by the strands 52 with respect to which the plate is superimposed. To this end, the opposite end portions of the plate 55 extend adjacent to the bracket 33 and means associated with the bracket cooperate with such end portions to retain the plate in place and afford the range of substantial floating movement. In one form, such means comprise the respective guide pins 58, conveniently in the form of screws adjustably screwed into respective threaded bosses 59 on the plate end portions, and each having a head 60 which rests against a shoulder flange 61 on the bracket 33 overlying the plate end portion in substantially spaced relation and having a respective hole 60a (FIG. 4) of smaller diameter than the pin head but of larger diameter than the pin shank to pass the latter therethrough freely. Although this arrangement permits the plate 55 to be suspended freely from the flanges 61 by means of the pins 58 under gravitational bias, so as to have positive backing thrust against the document passing through the scanning aperture assembly, additional mechanical bias may be imposed as by spring means comprising light weight coiled compression springs 62 thrusting at their opposite ends against the opposing faces of the bar or plate 55 and flange 61 about each of the pins 58. One attribute of the screwpin means 58 is that adjustment may be effected in the degree of pressure applied by the plate 55 under spring bias thrust, or the plate may be adjusted to a predetermined spacing relative to the opposed paper guiding surface means of the assembly such that up to a certain thickness frictional resistance to passage of a document through the guide is substantially eliminated, but because of the floating mounting of the plate, paper joints, multiple thicknesses, greater thicknesses, staples and the like on the passing document will be effectively accommodated without jamming.

Improved definition of the documentary material on the scanned face of the document is attained by having the surface of the plate 55 which faces into the aperture 27 of substantially white color as by means of a suitable coating on the surface, where the material of the plate 55 is not naturally of a substantially white color. For example, an inexpensive material for production of the plate 55 comprises steel plate or heavy gauge steel strip which is of a naturally dull and relatively dark color. Accordingly, at least the document-opposing surface area of the plate 55 is provided with a white colored coating 63. Since the highly concentrated light rays impinged theretoward are accompanied by substantial heat, the coating 63 should, under the circumstances of this use, be of a heat resistant type. While certain plated finishes may serve the purpose, a white vitreous enamel has been found satisfactory. In the enamelling process both faces of the plate may be coated, but it is the paper-opposing face which is important. In addition to improving image definition by providing a white background against which the darker information markings on the paper are more sharply delineated for scanning, the light colored surface treatment virtually eliminates edge dropoff or darkness on the copy sheet where the document is narrower than the copy sheet. This is often advantageous in affording a uniform copy appearance and size without necessity if trimming when reproducing undersize or variables sizes of documents.

In FIGS. 5-8, a document transport and scanning arrangement is represented in which the purpose, structure and function in a copymaking machine 10' are fully equivalent to the form of FIGS. 1-4 and the description in respect to this first-described form therefore applies equally, so that the following description will be devoted only to those features and elements which demonstrably reflect modification and improvement. Identical reference numerals identify corresponding elements in the two illustrated embodiments of the invention, and those identical reference numerals which are primed in FIGS. 5-8 are those which demonstrate some modification in structure and/or function.

One modification resides in the turn-around guide 24' which in this instance comprises complementary spaced outer and inner curved guide panel or plate elements 64 and 65, respectively, defining the turn-around passage 23' therebetween having an entry end receptively aligned with the offrunning side of the nips of the driven roller 21' and the idler roller 22' while the delivery end of the turn around guide passage is aligned with but has interposed between it and the approach side of the scanning aperture device positive transport rollers comprising a driven friction roller 67 and an opposed idler roller 68. Through this arrangement the turn-around path 23' is on a substantial radius facilitating turn-around of documents on heavier or stiffer stock material.

A principal modification resides in the construction and simplified mounting of the elongated document hold-down and guiding backing plate 55'. In width and length and function the plate 55' is virtually identical to the plate 55 and is, actually, interchangeable with that plate upon elimination of the flange 61 from the mounting bracket so that the attachment flanges 38 of the brackets 33' do not carry such angular guide pin flange as in the first-described form of the invention. Instead, the attachment screws 39' serve as the means cooperating with the opposite end portions of the plate 55' to retain it in place and affording a substantial range of substantially floating movement of the plate to yield away from the underlying paper guiding means to pass document sheets of various thicknesses, grouped sheets, document fasteners, and the like. To this end, the plate 55' has integrally thereon and extending normal to its back face spaced inwardly from each longitudinal edge and located especially on its opposite endportions a retainer flange 69 which opposes in free relation the inner side of the shank of the retainer screw 39' at that side of the bracket flange 38, with an outwardly extending flange portion 70 desirably overlying the screw shank. It will be observed that the shanks of the screws 39', serving as guide pins, are spaced substantially from the back face of the plate 55'. Therefore, the plate is afforded a substantial range of floating movement away from the opposing guide faces 50 and more particularly the guide wires 52, with the screw shank guide pins 39' serving to retain the plate against displacement in either lateral direction from its functional relationship over the aperture 27. If it is desired to have the document-opposing working face of the plate 55' spaced slightly from the opposing paper guide surfaces, the relationship of the overhanging flanges 70 to the respective guide pin members 39' may be such that the guide pins engage the opposed surfaces of the flanges 70 and thereby define the desired spaced relation.

Desirably, the hold-down, backing plate 55' is constructed as a lightweight metal extrusion, such as aluminum. This is advantageous not only because of the relatively light weight, as for example, in contrast to a steel plate of the same rigidity, but because such an extrusion can be produced to be accurately flat and straight. By having the angularly related flanges 69 extend longitudinally throughout the length of the plate 55' thorough reinforcement is afforded against bending of the plate along its length and in extrusion production of the plate this enhances assurance of perfect straightness and freedom from warpage in the plate. An additional function of the flanges 69, 70 resides in affording a substantially marginally weight balanced relationship of the plate and providing desirable graviational biasing means in view of the lightweight nature of the material from which the plate is made.

Since the normal surface of the aluminum extrusion normally presents a dull, relatively dark metallic color, at least the document-opposing face of the plate 55' is treated with a coating 63' desirably in the form of a clear mat anodized finish which affords a relatively white appearance and has been found to function just as effectively as a white surface provided, for example, by vitreous enamel, in affording improved definition of the documentary material and avoiding darkening or accentuated falloff at the edges of the reproduced image from an undersized document. Anodizing is less expensive than vitreous enamelling. Further, possibility of warpage is avoided by anodizing.

It will be understood that various modifications may be suggested by the embodiments disclosed, but we desire to claim within the scope of the patent warranted hereon

We claim as our invention:

1. In apparatus of the character described:
    means defining an elongated scanning aperture disposed to receive document-illuminating light therethrough and providing document guiding means along longitudinal edges of the aperture;
    means cooperatively related to said aperture means to transport a document at substantial speed across said aperture;
    an elongated document hold-down and guiding plate substantially floatingly opposing said guiding means and providing a document backing over said aperture; and
    means cooperating with the opposite end portions of said plate including guide pins retaining it in place and affording a substantial range of pin-guided substantially floating movement of said plate to yield away from said guiding means to pass double sheets or various thicknesses of documents, document-carried fasteners, and the like.

2. Apparatus as defined in claim 1, including biasing spring means about the pins normally urging said plate toward said guiding means.

3. Apparatus as defined in claim 1, in which said guide pins are attached to said plate.

4. Apparatus as defined in claim 3, in which said pins are screws and said plate has holes within which said pins are engaged.

5. Apparatus as defined in claim 4, including bracket structure supporting said screws.

6. Apparatus as defined in claim 1, in which said plate comprises a lightweight metal extrusion, and said plate has means comprising part of the extrusion on its opposite ends cooperating with said pins for retaining and guiding the plate.

7. In apparatus of the character described:
    means defining a delivery path for a document to be scanned;
    roller means forming part of a document transport system receptive of the document from said delivery means to advance the document therefrom;
    document guiding means receptive of the document beyond said roller means;
    document turn-around means comprising additional document advancing rollers forming part of the transport system, and curved surface means defining a curved passage having an entry end aligned to receive the document after it leaves said guiding means and turning the advancing documents toward an exit end from the passage directed generally toward but spaced from said first mentioned roller means; and
    scanning aperture means located between said exit end and said first mentioned roller means and including frame structure defining an elongated scanning aperture disposed to receive document illuminating light therethrough and providing document guiding surfaces along longitudinal edges providing an approach edge and a recession edge along the aperture, and an elongated document hold-down and guiding plate substantially floatingly opposing said guiding means and providing a document backing over said aperture;
    said first mentioned roller means receiving the document beyond said aperture means and transporting the document away therefrom.

8. Apparatus as defined in claim 7, in which one of said curved surfaces is provided by a roller.

9. In apparatus of the character described:
    means defining a delivery passage for documents to be scanned;
    means defining an exit passage in spaced adjacency below said delivery passage means;
    means defining a transport system between said passages and including structure to guide a document in a continuous path comprising a turn-around passage which reverses the document in its travel; and
    scanning aperture apparatus located between said turn-around passage and said exit passage and including means defining an elongated scanning aperture extending across and in parallel relation to said path after reversal in travel thereof to receive the document thereacross and providing document guiding means along the longitudinal edges of the aperture, and a substantially floatingly mounted elongated document hold-down and guiding plate opposing said guiding means and providing a document backing over said aperture.

10. In combination in scanning aperture means of the character described:
    means defining an elongated scanning aperture;
    an elongated hold-down plate bar comprising a lightweight metal extrusion having a document opposing face in document guiding opposed relation to said aperture defining means and a back face having thereon longitudinally extending reinforcing flanges; and
    means cooperating with said flanges to retain the plate in substantially floating relation to said aperture defining means.

11. In scanning aperture means of the character described including a scanning aperture:
    an elongated hold-down plate bar having a document-opposing face for document guiding opposed relation to the aperture, and an opposite back face; and
    longitudinally extending reinforcing flanges on said back face and having end portions with parts of the flanges opposing the plate in spaced relation and adapted to receive guide pins extending into the space between said flange portions and the plate.

12. In apparatus of the character described:
    means defining an elongated scanning aperture disposed to receive document-illuminating light therethrough and providing document guiding means along longitudinal edges of the aperture;
    means cooperatively related to said aperture means to transport a document at substantial speed across said aperture;
    an elongated document hold-down and guiding plate substantially floatingly opposing said guiding means and providing a document backing over said aperture; and
    means cooperating with the opposite end portions of said plate retaining it in place and affording a substantial range of substantially floating movement of said plate to yield away from said guiding means to pass double sheets or various thicknesses of documents, document-carried fasteners, and the like;
    said aperture-defining means including surfaces to reflect light into said aperture and toward said plate.

13. In apparatus of the character described:
    means defining an elongated scanning aperture disposed to receive document-illuminating light therethrough and providing document guiding means along longitudinal edges of the aperture;
    means cooperatively related to said aperture means to transport a document at substantial speed across said aperture;
    an elongated document hold-down and guiding plate substantially floating opposing said guiding means and providing a document backing over said aperture; and
    means cooperating with the opposite end portions of said plate retaining it in place and affording a substantial range of substantially floating movement of said plate to yield away from said guiding means to pass double sheets or various thicknesses of documents, document-carried fasteners, and the like;

said plate having an aperture-opposing surface of light color to afford improved definition of documentary material on the scanned face of a document passing between the plate and said guide means, and avoiding edge dropoff darkening on a copy to which image from the document is projected where the document is narrower than the copy sheet so as to avoid necessity for trimming the copy sheet where the image is thereon derived from an undersized document.

14. Apparatus as defined in claim 13, in which said surface has a white vitreous enamal coat.

15. Apparatus as defined in claim 13, in which said plate is aluminum, and said surface has a clear mat anodized finish.

16. In combination in a scanning aperture unit:
respective brackets adapted to be secured to supporting structure in a copy machine housing at opposite sides of a sheet travel path;
spaced aperture frame bars extending across the travel path defining an elongated scanning aperture therebetween and secured at their opposite ends to the respective brackets, one bar providing an approach edge for the aperture and the other bar providing a recession edge for the aperture;
an elongated hold-down plate substantially floatingly confronting said bars over said aperture; and
cooperating retaining means for the plate on the plate and on said brackets.

17. A structure as defined in claim 16, in which said retaining means include guide pins in engagement with said brackets.

18. A structure as defined in claim 17, in which said guide pins comprise screws projecting from said brackets and said plate having means cooperating with the screws.

19. Apparatus of the character described having means defining an elongated scanning aperture disposed to receive document-illuminating light therethrough and a document hold-down and guiding plate mounted to oppose said scanning aperture means to maintain the document in a scanning plane as it passes across the aperture, and means cooperatively related to the aperture means to transport a document at substantial speed across the aperture;
said aperture defining means comprising spaced-apart separate bars providing respectively in approaching edge and a recession edge for the aperture;
a wire engaged upon said bars and extending across the aperture in a guiding grid to avoid deflection of leading edges of documents into the aperture;
bracket structure secured to the opposite ends of the bars; and
said wire having opposite ends clampingly secured between said brackets and a respective bar end at each end of the aperture.

20. In apparatus of the character described, means defining an elongated scanning aperture adapted to receive document-illuminating light therethrough and providing document guiding means thereacross;
respective bars providing spaced approach and recession edges for the aperture;
respective brackets secured to the ends of said bars and thereby securing them in a quadrangular frame;
flanges on said brackets adapted to be secured to supporting structure in a copying machine;
a document hold-down and guiding plate confronting said bars across said aperture and having end portions adjacent to said brackets; and
guide pins related to said brackets and said end portions of said plate to guide the plate substantially floatingly relative to said bars.

References Cited

UNITED STATES PATENTS

| 1,344,896 | 6/1920 | Jobke | 88—24 |
| 3,181,420 | 5/1965 | Rautbord et al. | 88—24 |
| 3,272,100 | 9/1966 | Teutsch | 88—24 X |

NORTON ANSHER, *Primary Examiner.*

R. A. WINTERCORN, *Assistant Examiner.*

U.S. Cl. X.R.

355—8